Oct. 31, 1961 E. MacCALLUM 3,006,444
CLIP
Filed Aug. 18. 1958 2 Sheets-Sheet 1
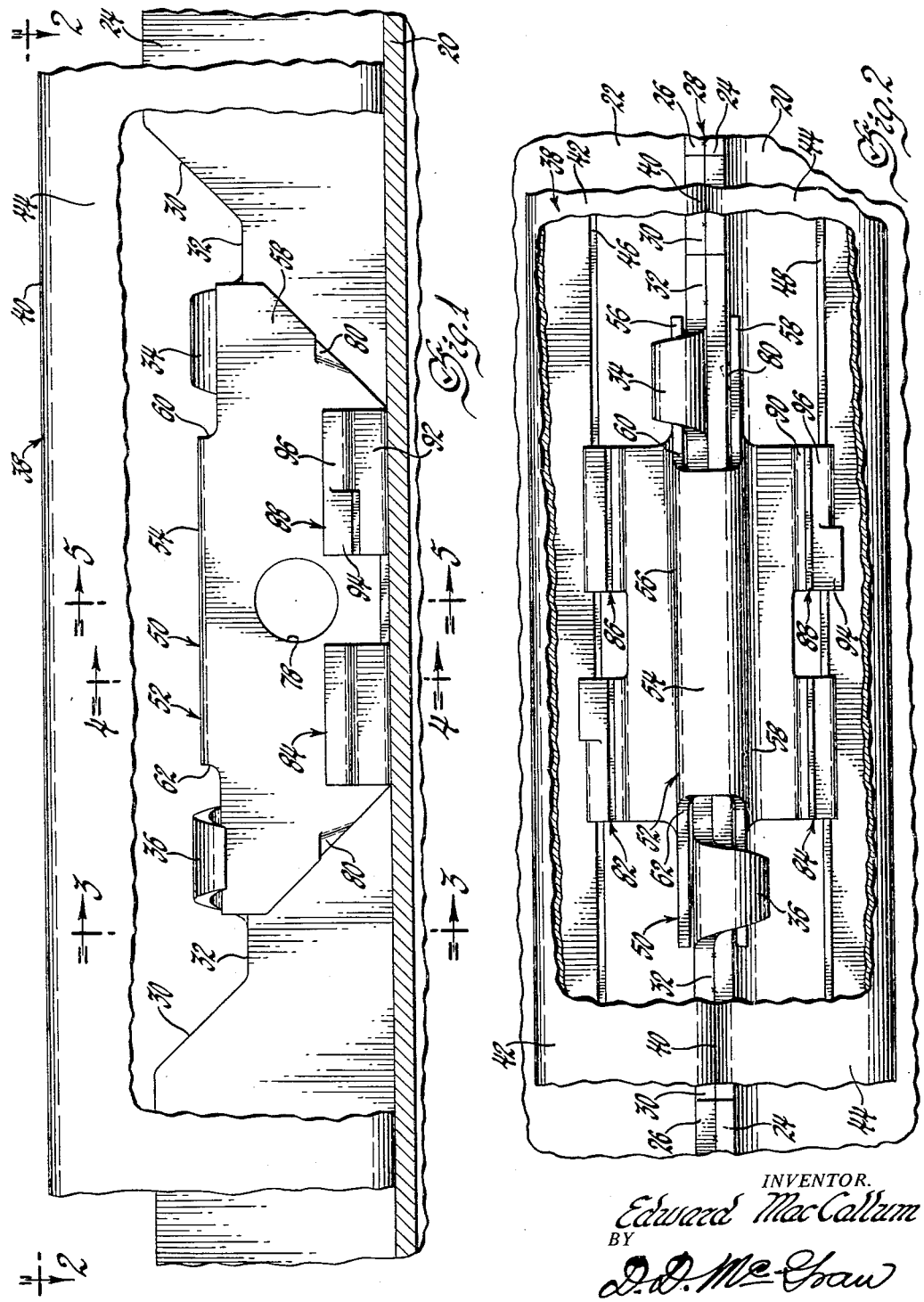
INVENTOR.
Edward MacCallum
BY
D.D. McGraw
ATTORNEY Oct. 31, 1961  E. MacCALLUM  3,006,444
CLIP
Filed Aug. 18. 1958  2 Sheets-Sheet 2
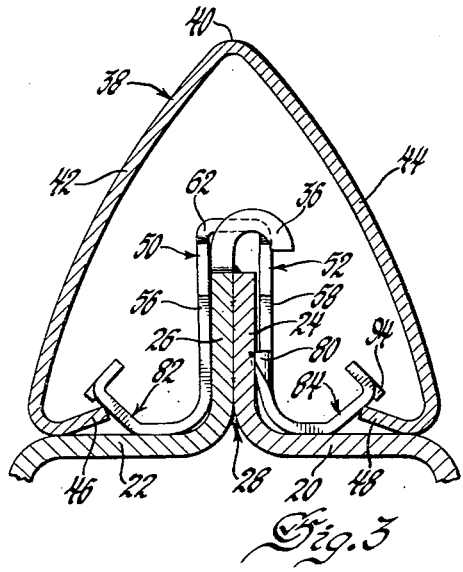
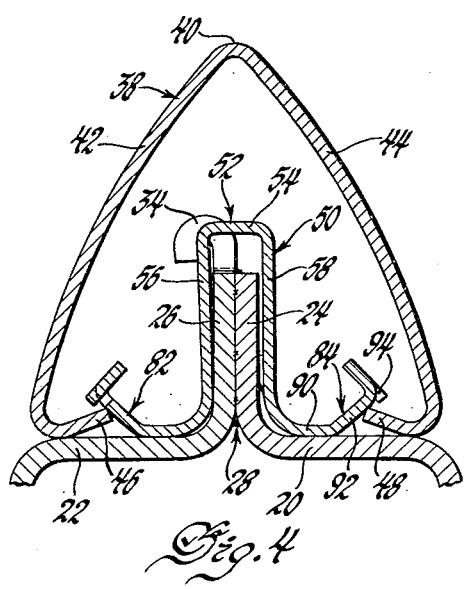
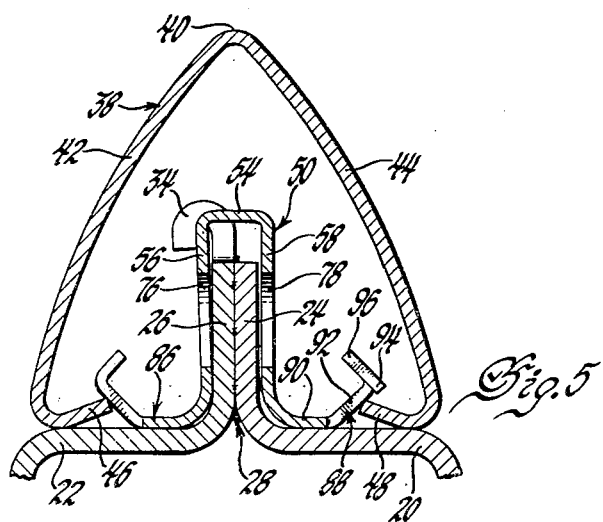
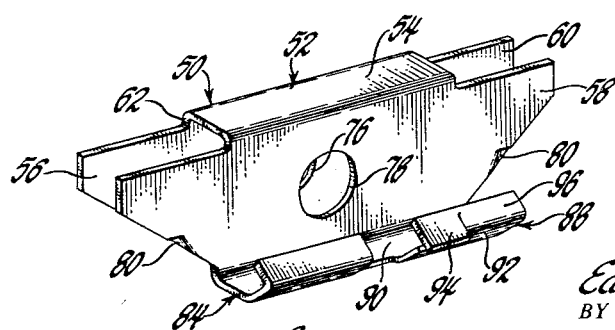
INVENTOR.
Edward MacCallum
BY
D. D. McGraw
ATTORNEY United States Patent Office 3,006,444
Patented Oct. 31, 1961

3,006,444
CLIP
Edward MacCallum, Grosse Pointe Woods, Mich., assignor to General Motors Corporation, Detroit, Mich., a corporation of Delaware
Filed Aug. 18, 1958, Ser. No. 755,588
6 Claims. (Cl. 189—88)

The invention relates to a clip for holding a molding strip in place on a section of paneling and more particularly to a clip which may be secured to a pinchweld joint formed in the paneling over which the molding is to be placed. When two or more panel sections are joined together, it is common practice to provide flanges on adjacent panels which extend outwardly from the planes of the panels and are substantially parallel. These flanges may be spot welded or otherwise secured together to provide a joint usually referred to as a pinchweld. When such joints are used on commercial products such as automobiles and household appliances, the pinchweld usually extends from the outer panel surface and forms a ridge which should be covered by a molding of suitable formation. The molding serves as a joint cover as well as being useful for decorative purposes.

The clip embodying the invention may be positively fastened to the pinchweld and retained within the hollow section of the molding. It is preferable to provide the clip with attaching means by which it may be secured to the pinchweld rather than to either of the panel sections directly. This arrangement permits a panel structure having no clip receiving apertures extending therethrough and obviates the necessity of sealing such apertures. The clip now proposed is preferably secured to the pinchweld initially by one or more barbs which are integrally formed with the clip. It may then be permanently secured to the pinchweld by suitable means such as a bent tab extending over a portion of the clip body, the tab being formed from a section of the pinchweld. It is also desirable to provide the clip with aligned apertures through which other securing means such as a pin, screw or bolt may be inserted and attached to hold the clip positively in place.

In the drawings:

FIGURE 1 is an elevation view of a pinchweld and molding strip assembly using a clip embodying the invention and having parts broken away and in section.

FIGURE 2 is a view of the assembly taken in the direction of arrows 2—2 of FIGURE 1 and having parts broken away and in section.

FIGURE 3 is a cross-sectional view of the assembly taken in the direction of arrows 3—3 of FIGURE 1 and having parts broken away and in section.

FIGURE 4 is a view of the assembly taken in the direction of arrows 4—4 of FIGURE 1 and having parts broken away and in section.

FIGURE 5 is a view of the assembly taken in the direction of arrows 5—5 of FIGURE 1 and having parts broken away and in section.

FIGURE 6 is an isometric view of the clip of the assembly illustrated in FIGURE 1.

The assembly shown in the drawings includes panels 20 and 22 which are provided with vertical flanges 24 and 26. These flanges are arranged in parallel relation when the panels are assembled and are joined together by a spot welding operation. The welded flanges thus provide a pinchweld 28. The flanges 24 and 26 are undercut as indicated at 30 to provide notches 32 at spaced intervals along the pinchweld. Either or both of the flanges may be provided with upwardly extending tabs 34 and 36 which are formed within a notch 32. In this instance, tab 34 is shown as being formed from the flange 26 and tab 36 as being formed from flange 26. The tabs are originally formed to extend upwardly in the plane of the pinchweld and are bent over as illustrated in the drawings after the clip to be described is installed in place.

A molding strip 38 may be positioned over the pinchweld 28 to protect the pinchweld as well as to make the final product, of which panels 20 and 22 are a part, more attractive. The molding strip illustrated is generally triangular in cross section with the molding apex 40 positioned substantially in the plane of the pinchweld 28 when the assembly is completed. The sides 42 and 44 of the molding extend downwardly and outwardly from the apex 40 and terminate with inwardly turned flanges 46 and 48, respectively. These flanges preferably extend in slightly upturned directions so that the molding strip engages the panels 20 and 22 with curved surfaces.

The clip 50 is formed so that it receives the pinchweld 28 intermediate its sides and has portions engaging the molding flanges 46 and 48 to hold the molding firmly in place. Clip 50 is preferably formed with a body 52 which extends longitudinally of the clip. This body may be formed in a generally channel-shaped cross section having a body center section 54 and side sections 56 and 58. All of these sections are integrally formed to provide the channel section of body 52.

Each outer end of the body may be undercut to provide forked apertures 60 and 62 which receive tabs 34 and 36 therethrough when the clip is placed over the pinchweld 28. The apertures 60 and 62 may extend slightly into the upper portions of the side sections 56 and 58 if necessary in order to permit proper clip installation.

The clip body sides 56 and 58 extend downwardly along the outer surfaces of the pinchweld 28 when the clip is installed to provide the clip mounting portions of the clip body. Apertures 76 and 78 are formed respectively in sides 56 and 58 and are substantially in alignment so that any suitable securing means such as a screw or bolt may be passed therethrough if desired. If the pinchweld tabs 34 and 36 are broken off or otherwise unusable, a hole may be drilled through the pinchweld 28 in alignment with the apertures 76 and 78 and a fastener passed through the hole and the apertures to secure the clip in place on the pinchweld. Provision of a secondary securing means of this type is especially desirable when the molding strip 38 is being replaced in service since the tabs 34 and 36 are likely to be broken during removal of the old molding strip and any clips requiring replacement.

Body sides 56 and 58 may each be provided with one or more barbs 80 which are struck from and positioned on the sides so that they engage the outer surfaces of the pinchweld. The barbs are shown in this instance as being struck from the angled ends of sides 56 and 58. They permit the clip to be easily snapped on the pinchweld while preventing easy clip removal until the clip sides are first spread apart.

The clip body 52 is also provided with a pair of flanges 82 and 84 which are positioned intermediate apertures 76 and 78 and the body end having aperture 62 formed therein. A second pair of flanges 86 and 88 are similarly positioned between apertures 76 and 78 and the end having aperture 60 formed therein. Since each of the flanges in each flange pair are generally similar, only flange 88 will be described in detail. This flange is integrally formed from the body side 58 and extends outwardly from the lower end thereof, and then upwardly and outwardly, to provide a horizontal section 90 and upwardly and outwardly bent portion 92. The flange terminates in an inwardly and upwardly bent section 96 which may have a tongue 94 struck from a portion thereof to extend in a reverse direction to that of the main part of section 96. Any of the flanges 82, 84 and 86, 88 may be provided with tongues 94 if desired, or may be constructed without them. The clip is illustrated as having the tongues 94 formed only on flanges 82 and 88.

When the molding 38 is installed over the clip 50, the molding flange 48 will tightly engage the outer surface of flange section 92 and may also be engaged by the lower side of tongue 94. The molding will thus be held tightly against panel 29 by spring action of the flange 88. The other flanges will act in a similar manner to retain the molding. The horizontal distances between the points of engagement of molding flanges 46 and 48 with the clip flanges 82, 84 and 86, 88 are sufficiently greater than the distance between the inner edges of these molding flanges prior to the molding installation to provide a spring tension effect in each of the clip flanges engaged by the molding.

The assembly is normally made by installing the clip 50 downwardly over the pinchweld 28 so that the tabs 34 and 36 extend through their respective apertures 60 and 62. The tabs are then bent over the clip body 52 as illustrated to retain the clip in position. After the desired number of clips are installed at spaced points on the pinchweld, the molding strip 38 is snapped in position over the pinchweld and the assembly is completed. The molding retaining flanges 46 and 48, together with molding sides 42 and 44, are sufficiently spring-like in character to permit the molding to expand laterally and snap over the clip tongues 94 and engage the lower outer surface flange sections 92. The molding strip is then held firmly in place and completely covers the pinchweld as well as the clip to present a more attractive appearance and protect the pinchweld and clips from exterior damage.

The original molding strip may be removed when it is desirable, for any reason, to replace it. Should any of the clips need replacement, the tabs 34 and 36 may be straightened and the old clips removed. Since the tabs may be accidently broken off during this operation, the clips are also provided with means permitting them to be secured to the pinchweld by separate fasteners. Although this method of attachment is considered to be primarialy for service replacement rather than original installation, it may be used during the original assembly.

What is claimed is:

1. A clip for securing a flanged molding to a pinchweld, said clip comprising a clip body having a center section and two side sections integrally formed therewith and extending downwardly therefrom to provide an inverted channel-like cross section throughout the length of said clip, said body center section being undercut adjacent each end of said clip to form apertures defined by said center section and side sections extending through said body for receiving clip-holding tabs formed on the pinchweld, said body side sections each having a pair of flanges integrally formed therewith and extending outwardly therefrom to provide a substantially horizontal section and then extending upwardly and outwardly to provide a molding flange retaining section and then extending upwardly and inwardly to provide a flange end section, at least one of said flanges having a tongue struck from said flange section adjacent said molding flange engaging section and extending outwardly and downwardly relative to said clip body to provide a molding flange retainer, said body side sections also having substantially aligned apertures formed therethrough for receiving clip anchor means.

2. The clip of claim 1, each of said body side sections having angularly beveled ends formed thereon and at least one barb struck from one of said beveled ends for engaging and holding said clip to the pinchweld.

3. In combination in a pinchweld molding strip securing assembly, at least two panels having complementary notched flanges joined to form a pinchweld having spaced notches therein, upwardly extending tabs integrally formed from portions of said pinchweld within said notches, a molding strip having an arched cross section and inwardly turned flanges formed adjacent either edge, and a clip received within one of said pinchweld notches and securing said molding strip to said pinchweld whereby said clip and said pinchweld are covered by said molding in the assembled position, said clip comprising a clip body having open ended apertures formed therein and receiving said tabs, mounting flanges extending downwardly and formed integrally with said clip body and receiving said pinchweld therebetween, and molding-engaging flanges formed on said mounting flanges and extending first outwardly and then outwardly and upwardly in relation to said clip body and springingly engaging said molding flanges and said panels whereby said molding is held in position over said pinchweld and on said panels, said tabs being bent over said clip body to retain said clip to said pinchweld.

4. The assembly of claim 3, said clip mounting flanges having substantially aligned apertures formed therethrough for receiving separate clip securing means for fastening said clip to said pinchweld.

5. The assembly of claim 3, said mounting flanges having angularly beveled edges at either end of said clip and a pinchweld-engaging barb struck from one of said edges and extending therefrom inwardly of said clip and gripping said pinchweld.

6. The assembly of claim 3, said molding-engaging flanges having upwardly and inwardly extending flange ends formed thereon and at least one of said flanges having a tongue struck outwardly therefrom adjacent the molding-engaging section for positively retaining said molding flanges.

References Cited in the file of this patent

UNITED STATES PATENTS

| | | |
|---|---|---|
| 1,451,043 | Le Compte | Apr. 10, 1923 |
| 2,216,219 | Wiley | Oct. 1, 1940 |
| 2,227,290 | Wiley | Dec. 31, 1940 |
| 2,327,329 | Murphy | Aug. 17, 1943 |
| 2,350,315 | Kral | May 30, 1944 |
| 2,539,956 | Klingensmith | Jan. 30, 1951 |
| 2,746,111 | Chvosta | May 22, 1956 |
| 2,837,184 | Fernberg | June 3, 1958 |

FOREIGN PATENTS

| | | |
|---|---|---|
| 696,800 | Great Britain | Sept. 9, 1953 |